United States Patent [19]

Katsumura et al.

[11] Patent Number: 5,034,456

[45] Date of Patent: Jul. 23, 1991

[54] ADHESIVE COMPOSITION

[75] Inventors: Tasuo Katsumura; Tadashi Inamura, both of Hyogo; Eizo Kajigaki, Osaka, all of Japan

[73] Assignee: Takeda Chemical Industries, Ltd., Osaka, Japan

[21] Appl. No.: 496,692

[22] Filed: Mar. 21, 1990

[30] Foreign Application Priority Data

Mar. 24, 1989 [JP] Japan .................. 1-72740

[51] Int. Cl.$^5$ .................. C08L 33/14; C08F 4/52
[52] U.S. Cl. .................. 524/850; 526/196; 526/297
[58] Field of Search ................. 524/850; 526/196, 297

[56] References Cited

U.S. PATENT DOCUMENTS

| | | | |
|---|---|---|---|
| 2,763,585 | 9/1956 | Coover, Jr. et al. | 154/43 |
| 2,912,454 | 11/1959 | McKeever | 260/465.4 |
| 3,692,752 | 9/1972 | Setsuda et al. | 526/297 |
| 3,836,565 | 9/1974 | Brinkman et al. | 260/464 |
| 4,076,685 | 2/1978 | Kögler | 524/850 |
| 4,581,313 | 4/1986 | Minamizono et al. | 430/145 |

*Primary Examiner*—Joseph L. Schofer
*Assistant Examiner*—R. H. Delmendo
*Attorney, Agent, or Firm*—Wegner, Cantor, Mueller & Player

[57] ABSTRACT

An $\alpha$-cyanoacrylate base adhesive composition comprising 0.0001 to 0.5 part by weight of borofluoric acid on a 100% basis per 100 parts by weight of an $\alpha$-cyanoacrylate monomer, which composition has improved storage stability.

5 Claims, No Drawings

ADHESIVE COMPOSITION

BACKGROUND OF THE INVENTION

1. Field of the Invention

The present invention relates to an adhesive composition. In particular, the present invention relates to an α-cyanoacrylate base adhesive composition having good storage stability.

2. Description of the Related Art

Since an α-cyanoacrylate base adhesive is a reactive adhesive comprising an α-cyanoacrylate monomer, it tends to be cured in an adhesive container during storage because of radical or anionic polymerization of said monomer. Therefore, a polymerization inhibitor is added to the adhesive as a stabilizer to improve the storage stability of the adhesive.

As the radical polymerization inhibitor for the α-cyanoacrylate monomer are used hydroquinone, hydroquinone monomethyl ether, catechol, pyrogallol, bisphenol A and the like. The polymerization inhibitor is added to the adhesive in an amount of 1 to 5000 ppm to inhibit the radical polymerization during room temperature storage.

The anionic polymerization is initiated with a small amount of moisture or a base such as an amine and ammonia. To prevent increase of viscosity and gelation due to anionic polymerization of the monomer are used $SO_2$, $SO_3$, $SOCl_2$, $SO_2Cl_2$, HF, $BF_3$, $BF_3$-ether complexes, $NO_2$, paratoluenesulfonic acid, methanesulfonic acid, propanesultone, phosphoric acid, sulfuric acid and the like.

However, the addition of the anionic polymerization inhibitor increases the setting time of the adhesive and deteriorates instantaneous adhesivity. Since such inhibitors are in a gas state at ambient temperature, their handling and adjustment of their concentration in the adhesive are difficult. Some of them such as $SO_3$ and $BF_3$-ether complexes tend to fume and color the adhesive.

SUMMARY OF THE INVENTION

An object of the present invention is to provide a novel anionic polymerization inhibitor which is useful as a stabilizer for an α-cyanoacrylate base adhesive.

Another object of the present invention is to provide an α-cyanoacrylate base adhesive composition which does not suffer from the drawbacks of the conventional α-cyanoacrylate base adhesives.

Accordingly, the present invention provides an α-cyanoacrylate base adhesive composition comprising 0.0001 to 0.5 part by weight of borofluoric acid ($HBF_4$) (as 100 %) per 100 parts by weight of an α-cyanoacrylate monomer.

DETAILED DESCRIPTION OF THE INVENTION

Specific examples of the α-cyanoacrylate monomer which is a main component of the adhesive composition are methyl α-cyanoacrylate, ethyl α-cyanoacrylate, propyl α-cyanoacrylate, allyl α-cyanoacrylate, butyl α-cyanoacrylate, heptyl α-cyanoacrylate, hexyl α-cyanoacrylate, octyl α-cyanoacrylate, decyl α-cyanoacrylate, dodecyl α-cyanoacrylate, (2-chloroethyl) α-cyanoacrylate, (2-methoxyethyl) α-cyanoacrylate, (2-ethoxyethyl) α-cyanoacrylate, (2butoxyethyl) α-cyanoacrylate, benzyl α-cyanoacrylate, phenyl α-cyanoacrylate, trifluoroisopropyl α-cyanoacrylate, and the like.

Borofluoric acid ($HBF_4$) may be a commercially available one, for example, a 30 to 40 % aqueous solution thereof.

The amount of borofluoric acid on a 100 % basis is from 0.0001 to 0.5 part by weight, preferably 0.0002 to 0.02 part by weight per 100 parts by weight of the α-cyanoacrylate monomer.

The adhesive composition of the present invention may contain the above described conventional anionic polymerization inhibitor such as $SO_2$, $SO_3$, paratoluenesulfonic acid, methanesulfonic acid, propanesultone and the like.

In addition, the adhesive composition of the present invention may contain the above described conventional radical polymerization inhibitor such as hydroquinone, hydroquinone monomethyl ether, catechol, pyrogallol and the like.

To prepare the thickened adhesive composition, a thickening agent such as polymethyl methacrylate (PMMA), polyvinyl acetate, cellulose acetate isobutylate, acrylic elastomer and polyurethane can be added to the adhesive composition in an amount of about 1 to 20 % by weight of the α-cyanoacrylate monomer.

The adhesive composition of the present invention may contain a quick curing additive for shortening the setting time of the adhesive, an additive for increasing the adhesion strength, a plasticizer which imparts flexibility to the adhesive layer after curing, saturated polyester which improves impact resistance or peeling strength, a modifier for imparting heat resistance, and a dye or pigment for confirming the application of the adhesive composition. For example, methoxypolyethyleneglycol methacrylate, 18-crown-6ether or methoxyethyl gallate can be added to the adhesive composition in an amount of 0.05 to 10 % by weight of the α-cyanoacrylate monomer.

Since borofluoric acid can be handled in the form of an aqueous solution, its concentration in the adhesive composition is more easily adjusted than the gaseous stabilizers such as $SO_2$ and HF. In addition, unlike $BF_3$ complexes, borofluoric acid does not fume or color the composition.

The adhesive composition of the present invention has good storage stability and short setting time when it is used to adhere, in particular, wooden pieces.

PREFERRED EMBODIMENTS OF THE INVENTION

The present invention will be illustrated by following Examples, in which "parts" are by weight.

EXAMPLES 1-8 AND COMPARATIVE EXAMPLES 1-9

To 100 parts of ethyl α-cyanoacrylate, 0.05 part of hydroquinone was added. Then, to the mixture, borofluoric acid, $SO_2$, HF, $BF_3$-ether complex ($BF_3.O(C_2H_5)_2$), methanesulfonic acid, polymethyl methacrylate (PMMA), polyurethane, polyester, acrylic elastomer, methoxypolyethyleneglycol (#1000) methacrylate (MPEGMA), 18-crown-6-ether, pyrogallol and/or gallate was added in an amount (part) shown in Tables 1 and 2 to prepare an adhesive composition.

With the prepared adhesive composition, a pair of Birch pieces or a pair of steel pieces were adhered for measuring the setting time. The adhesive composition was filled in a polyethylene container and the gelation test was carried out at 70° C. The results are shown in Tables 1 and 3.

acid per 100 parts by weight of an α-cyanoacrylate monomer.

TABLE 1

| Example No. | HBF$_4$ (as 100%) | SO$_2$ | HF | BF$_3$·O(C$_2$H$_5$)$_2$ | PMMA | MPEGMA | Setting time*[1] Birch (sec.) | Setting time*[1] Steel (sec.) | Gelation test (70° C.) | Degree of coloring (APHA) |
|---|---|---|---|---|---|---|---|---|---|---|
| 1 | 0.0005 | 0 | 0 | 0 | 0 | 0 | — | 15 | Stable more than 30 days | 30 |
| 2 | 0.0003 | 0 | 0 | 0 | 0 | 0.20 | — | 5 | 20 days | 30 |
| 3 | 0.0015 | 0 | 0 | 0 | 10 | 0.20 | 15 | 25 | 35 days | 30 |
| 4 | 0.0015 | 0.0010 | 0 | 0 | 10 | 0.20 | 20 | 30 | 37 days | 30 |
| 5 | 0.0025 | 0 | 0 | 0 | 0 | 0.20 | — | 15 | 45 days | 30 |
| 6 | 0.5000 | 0 | 0 | 0 | 0 | 0.20 | — | 300 | 45 days | 50 |
| C. 1 | 0 | 0.0005 | 0 | 0 | 0 | 0 | — | 15 | Gelled after 25 days | 30 |
| C. 2 | 0 | 0.0003 | 0 | 0 | 0 | 0.20 | — | 10 | 7 days | 30 |
| C. 3 | 0 | 0.0015 | 0 | 0 | 10 | 0.20 | 30 | 35 | 15 days | 30 |
| C. 4 | 0 | 0.0010 | 0 | 0.0015 | 10 | 0.20 | 25 | 30 | 20 days | 80 |
| C. 5 | 0 | 0 | 0.0025 | 0 | 0 | 0.20 | — | 30 | 10 days | 30 |
| C. 6 | 0 | 0 | 0 | 0.5000 | 0 | 0.20 | — | 420 | 30 days | *[2] |

Note:
*[1]According to JIS K 6861
*[2]Not measurable. Colored in dark brown.

TABLE 2

| Example No. | HBF$_4$ (as 100%) | SO$_2$ | CH$_3$SO$_3$H | Polyurethane*[1] | Polyester*[2] | Acrylic elastomer*[3] | MPEGMA | 18-Crown 6-ether | Pyrogallol | Methoxyethyl gallate |
|---|---|---|---|---|---|---|---|---|---|---|
| 7 | 0.0015 | 0 | 0 | 5 | 0 | 0 | 0.10 | 0 | 0 | 0.10 |
| 8 | 0.0015 | 0 | 0 | 0 | 5 | 0 | 0 | 0.05 | 0.10 | 0 |
| 9 | 0.0100 | 0.0025 | 0 | 0 | 0 | 10 | 0.10 | 0 | 0.10 | 0 |
| C. 7 | 0 | 0.0015 | 0 | 5 | 0 | 0 | 0.10 | 0 | 0 | 0.10 |
| C. 8 | 0 | 0.0015 | 0 | 0 | 5 | 0 | 0 | 0.05 | 0.10 | 0 |
| C. 9 | 0 | 0.0025 | 0.0100 | 0 | 0 | 10 | 0.10 | 0 | 0.10 | 0 |

TABLE 3

| Example No. | Setting time*[4] (steel, sec.) | Gelation time (70° C.) | Degree of coloring (APHA) |
|---|---|---|---|
| 7 | 20 | Stable more than 25 days | 30 |
| 8 | 20 | Stable more than 25 days | 30 |
| 9 | 90 | Stable more than 15 days | 40 |
| C. 7 | 25 | Gelled after 20 days | 30 |
| C. 8 | 25 | Gelled after 20 days | 30 |
| C. 9 | 180 | Gelled after 10 days | 80 |

Note:
*[1]DESMOCOLL 406 (manufactured by BAYER AG)
*[2]VYLON 200 (manufactured by Toyobo)
*[3]HYCAR 4021 (manufactured by Nippon Zeon)
*[4]According to JIS K 6861

What is claimed is:

1. An α-cyanoacrylate base adhesive composition comprising 0.0001 to 0.5 part by weight of borofluoric acid per 100 parts by weight of an α-cyanoacrylate monomer.

2. The adhesive composition according to claim 1, which further comprises methoxypolyethyleneglycol methacrylate.

3. The adhesive composition according to claim 1, wherein the amount of borofluoric acid is from 0.0002 to 0.02 part by weight per 100 parts by weight of the α-cyanoacrylate monomer.

4. The adhesive composition according to claim 1, which further comprises a thickening agent in an amount of 1 to 20 % by weight of the α-cyanoacrylate monomer.

5. The adhesive composition according to claim 1, which further comprises about 0.05 part by weight hydroquinone per 100 parts by weight of the α-cyanoacrylate monomer.

* * * * *

UNITED STATES PATENT AND TRADEMARK OFFICE
CERTIFICATE OF CORRECTION

PATENT NO. : 5,034,456

DATED : July 23, 1991

INVENTOR(S) : Tasuo KATSUMURA et al.

It is certified that error appears in the above-identified patent and that said Letters Patent is hereby corrected as shown below:

On the title page item [73] change the name of the Assignee from:

"Takeda Chemical Industries, Ltd., Osaka, Japan"

to:

--Taoka Chemical Company, Ltd., Osaka, Japan--

Signed and Sealed this

First Day of December, 1992

*Attest:*

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 5,034,456
DATED : July 23, 1991
INVENTOR(S) : Yasuo KATSUMURA et al.

It is certified that error appears in the above-identified patent and that said Letters Patent is hereby corrected as shown below:

Title page: Item 75, inventors change:

"Tasuo" to --Yasuo--

Signed and Sealed this

Ninth Day of February, 1993

*Attest:*

STEPHEN G. KUNIN

*Attesting Officer*         Acting Commissioner of Patents and Trademarks